US010811686B2

(12) United States Patent
Aoki et al.

(10) Patent No.: US 10,811,686 B2
(45) Date of Patent: Oct. 20, 2020

(54) SLURRY FOR POSITIVE ELECTRODE OF LITHIUM-ION SECONDARY BATTERY, POSITIVE ELECTRODE FOR LITHIUM-ION SECONDARY BATTERY OBTAINED USING SLURRY FOR POSITIVE ELECTRODE OF LITHIUM-ION SECONDARY BATTERY AND PRODUCTION METHOD THEREFOR, AND LITHIUM-ION SECONDARY BATTERY PROVIDED WITH POSITIVE ELECTRODE FOR LITHIUM-ION SECONDARY BATTERY AND PRODUCTION METHOD THEREFOR

(71) Applicant: SHOWA DENKO K.K., Tokyo (JP)

(72) Inventors: Yusuke Aoki, Tokyo (JP); Mitsuru Hanasaki, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 291 days.

(21) Appl. No.: 15/750,860

(22) PCT Filed: Aug. 3, 2016

(86) PCT No.: PCT/JP2016/072780
§ 371 (c)(1),
(2) Date: Feb. 7, 2018

(87) PCT Pub. No.: WO2017/026345
PCT Pub. Date: Feb. 16, 2017

(65) Prior Publication Data
US 2018/0233750 A1 Aug. 16, 2018

(30) Foreign Application Priority Data

Aug. 11, 2015 (JP) .................................. 2015-158831

(51) Int. Cl.
H01M 4/62 (2006.01)
H01M 4/139 (2010.01)
H01M 4/13 (2010.01)
C08L 71/02 (2006.01)
C08F 220/04 (2006.01)
C08L 31/06 (2006.01)
C08F 220/28 (2006.01)
C09D 5/24 (2006.01)
C09D 101/10 (2006.01)
C09D 171/02 (2006.01)
H01M 4/04 (2006.01)
H01M 4/505 (2010.01)
H01M 4/525 (2010.01)
H01M 4/58 (2010.01)
H01M 10/0525 (2010.01)
H01M 10/052 (2010.01)
H01M 10/058 (2010.01)
H01M 4/02 (2006.01)

(52) U.S. Cl.
CPC ............ *H01M 4/622* (2013.01); *C08F 220/04* (2013.01); *C08F 220/28* (2013.01); *C08L 31/06* (2013.01); *C08L 71/02* (2013.01); *C09D 5/24* (2013.01); *C09D 101/10* (2013.01); *C09D 171/02* (2013.01); *H01M 4/0404* (2013.01); *H01M 4/13* (2013.01); *H01M 4/139* (2013.01); *H01M 4/505* (2013.01); *H01M 4/525* (2013.01); *H01M 4/5825* (2013.01); *H01M 4/62* (2013.01); *H01M 4/625* (2013.01); *H01M 10/0525* (2013.01); *H01M 10/052* (2013.01); *H01M 10/058* (2013.01); *H01M 2004/028* (2013.01)

(58) Field of Classification Search
CPC ...... H01M 4/00; H01M 10/00; H01M 4/0404; H01M 4/13; H01M 4/139; H01M 4/505; H01M 4/525; H01M 4/5825; H01M 4/62; H01M 4/622; H01M 4/625; C08F 220/04; C08F 220/28; C08L 31/06; C08L 71/02; C09D 5/24; C09D 101/10; C09D 171/02
See application file for complete search history.

(56) References Cited

U.S. PATENT DOCUMENTS 5,240,644 A * 8/1993 Barry, Jr. ........... C08G 73/1046
252/500
2007/0055023 A1 3/2007 Han et al.
2015/0017533 A1 1/2015 Takahashi et al.

FOREIGN PATENT DOCUMENTS

CN 103400990 A 11/2013
CN 104335400 A 2/2015
(Continued)

OTHER PUBLICATIONS

Notice of Allowance dated Nov. 8, 2019, issued by the Korean Intellectual Property Office in counterpart Application No. 10-2018-7003175.

(Continued)

Primary Examiner — James Lee
(74) Attorney, Agent, or Firm — Sughrue Mion, PLLC

(57) ABSTRACT

A slurry for a positive electrode of a lithium-ion secondary battery. Also disclosed is a positive electrode for a lithium-ion secondary battery obtained using the slurry for a positive electrode of a lithium-ion secondary battery, and a production method for the electrode; and a lithium-ion secondary battery provided with the positive electrode for a lithium-ion secondary battery, and a production method for the battery. The slurry for a positive electrode of a lithium-ion secondary battery includes a positive electrode active material (A), a conductive auxiliary agent (B), a resin binder (C), a thickening dispersant (D), and water (E), wherein the thickening dispersant (D) includes a polyalkylene oxide having a phenyl group in a side chain thereof.

7 Claims, No Drawings

(56) References Cited

FOREIGN PATENT DOCUMENTS

| JP | 52-134642 A | 11/1977 |
|---|---|---|
| JP | 3-212428 A | 9/1991 |
| JP | 10-241693 A | 9/1998 |
| JP | 10-255808 A | 9/1998 |
| JP | 2007-234277 A | 9/2007 |
| JP | 2011-243464 A | 12/2011 |
| JP | 2012-12350 A | 1/2012 |
| JP | 2014-143078 A | 8/2014 |
| JP | 2014-154360 A | 8/2014 |
| KR | 10-2013-0130830 A | 12/2013 |
| WO | 2013/114849 A1 | 8/2013 |
| WO | 2013/161305 A1 | 10/2013 |
| WO | 2014/115802 A1 | 7/2014 |

OTHER PUBLICATIONS

Communication dated Feb. 19, 2019 from European Patent Office in counterpart EP Application No. 16835042.9.
International Search Report for PCT/JP2016/072780 dated Oct. 25, 2016 [PCT/ISA/210].
Communication dated Apr. 23, 2019 from Korean Intellectual Property Office in counterpart Korean Application No. 10-2018-7003175.
Communication dated Apr. 14, 2020, from the State Intellectual Property Office of the P.R.C in application No. 201680045963.0.
Communication dated Jun. 23, 2020, from the Japanese Patent Office in application No. 2017-534384.

\* cited by examiner

SLURRY FOR POSITIVE ELECTRODE OF LITHIUM-ION SECONDARY BATTERY, POSITIVE ELECTRODE FOR LITHIUM-ION SECONDARY BATTERY OBTAINED USING SLURRY FOR POSITIVE ELECTRODE OF LITHIUM-ION SECONDARY BATTERY AND PRODUCTION METHOD THEREFOR, AND LITHIUM-ION SECONDARY BATTERY PROVIDED WITH POSITIVE ELECTRODE FOR LITHIUM-ION SECONDARY BATTERY AND PRODUCTION METHOD THEREFOR

CROSS REFERENCE TO RELATED APPLICATIONS

This application is a National Stage of International Application No. PCT/JP2016/072780, filed on Aug. 3, 2016, which claims priority from Japanese Patent Application No. 2015-158831, filed on Aug. 11, 2015, the contents of all of which are incorporated herein by reference in their entirety.

TECHNICAL FIELD

The present invention relates to a slurry for a positive electrode of a lithium-ion secondary battery, a positive electrode for a lithium-ion secondary battery obtained using the slurry for a positive electrode of a lithium-ion secondary battery, and a production method for the electrode. The present invention also relates to a lithium-ion secondary battery provided with the positive electrode for a lithium-ion secondary battery, and a production method for the battery.

This application is based upon and claims the benefit of priority to Japanese Patent Application No. 2015-158831 filed in Japan on Aug. 11, 2015, the contents of which are hereby incorporated by reference.

BACKGROUND ART

Lithium-ion secondary batteries are widely used as power sources for portable devices such as mobile phones and laptop computers, and also widely used as driving power sources for industrial devices requiring a long life such as power storage and electric vehicles. In the future, since a consumer equipment need further lightweight and downsizing, batteries having higher energy density are required. In addition, with the popularization of electric vehicles and stationary energy storage equipment in industrial equipment, high power, high capacity and long life performance corresponding to large batteries are required.

In order to achieve high energy density, high output, high capacity and long life of a lithium-ion secondary battery, a method of raising the operating voltage of the positive electrode to realize high capacity of the battery attracts attention. For example, a positive electrode active material such as a lithium-containing transition metal oxide represented by $LiMO_2$ (M is a transition metal) capable of stably storing and releasing lithium and electron at a high voltage of 4.3 V or more on the basis of lithium has been developed.

In addition, the positive electrode used in the lithium-ion secondary battery usually has a structure in which the positive electrode active material layer is laminated on the aluminum current collector. Besides the positive electrode active material, the positive electrode active material layer contains a binder for bonding the positive electrode active materials to each other and between the positive electrode active material and the current collector. In order to realize a high capacity and a long life of the lithium-ion secondary battery, as a binder, a material having higher binding force at small amount is required.

Generally, when a positive electrode slurry of a lithium-ion secondary battery is coated on a current collector to produce a positive electrode, an organic solvent such as N-methyl-2-pyrrolidone (hereinafter referred to as "NMP") is used as a solvent (see also, for example, Patent Document 1).

However, the PVDF-based binder cannot bind positive electrode active materials to each other and between the positive electrode active material and the current collector in a satisfactory manner. Therefore, there is a problem that charge/discharge cycle characteristics of the lithium-ion secondary battery deteriorate. For practical use, a large amount of PVDF type binder is necessary for ensuring sufficient binding property between the positive electrode active materials and between the positive electrode active material and the current collector. As a result, the capacity of the lithium-ion secondary battery is lowered. Furthermore, in the production of PVDF-based binder, development of a new binder utilizing water as a solvent is attracting attention because of NMP solvent has a high environmental burden due to mutagenicity of NMP solvent and the like.

On the other hand, a styrene-butadiene rubber (hereinafter also referred to as "SBR") widely used as an aqueous binder for a negative electrode has attracted attention in the development of an aqueous binder for a positive electrode. In addition, by using carboxymethyl cellulose (hereinafter also referred to as "CMC") as a thickening dispersant in an aqueous solvent together, it is possible to manufacture an electrode with low environmental burden. In addition, good binding properties between the positive electrode active materials and between the positive electrode active material and the current collector are realized (see, for example, Patent Document 2).

However, the SBR binder is characterized by its low oxidation resistance as a feature of its structure. Since charging and discharging are repeated under high voltage conditions, when the SBR binder is used in the positive electrode of the lithium-ion secondary battery which is required to have oxidation resistance, the long life property of the lithium-ion secondary battery may be deteriorated.

Furthermore, when a water-based solvent is used, a combination of a fluorine-based resin such as polyvinylidene fluoride (PVDF) or polytetrafluoroethylene (hereinafter also referred to as "PTFE") as a binder and a water-soluble polymer as a thickening dispersant is used to prepare an aqueous slurry for a positive electrode having high oxidation resistance, thereby improving long-life characteristics of the lithium-ion secondary battery (see, for example, Patent Document 3).

However, polarity of the fluorine-based resin binder is very low, and there is room for further improvement in binding between the positive electrode active materials and between the positive electrode active material and the current collector. In order to actually use it, a large amount of another binder is required to ensure sufficient binding between the positive electrode active materials and between the positive electrode active material and the current collector, and as a result, the capacity of the lithium-ion secondary battery may decrease.

[Patent Document 1] Japanese Unexamined Patent Application Publication No. 10-255808

[Patent Document 2] Japanese Unexamined Patent Application Publication No. 10-241693

[Patent Document 3] Japanese Unexamined Patent Application Publication No. 2007-234277

SUMMARY OF THE INVENTION

The present invention has been made to solve the above problems, and it is an object of the present invention to provide a slurry for a positive electrode of a lithium-ion secondary battery, which improves the dispersibility of a positive electrode active material, improves the coatability of a positive electrode slurry to a current collector, and obtains a lithium-ion secondary battery having a low initial resistance value; and also provides a positive electrode for a lithium-ion secondary battery obtained using the slurry for a positive electrode of a lithium-ion secondary battery, a production method for the electrode, a lithium-ion secondary battery provided with the positive electrode for a lithium-ion secondary battery, and a production method for the battery.

As a result of intensive studies to solve the problems as described above, the present inventors have found that by combining a specific resin binder and a specific thickening dispersant, the above problems can be solved, and the present invention is obtained.

That is, the present invention is represented by the following [1] to [8].

[1] A slurry for a positive electrode of a lithium-ion secondary battery, the slurry including a positive electrode active material (A), a conductive auxiliary agent (B), a resin binder (C), a thickening dispersant (D), and water (E), wherein the resin binder (C) is a copolymer of monomers which comprise an aromatic vinyl compound and at least one of an ethylenically unsaturated carboxylic acid ester and an ethylenically unsaturated carboxylic acid, and wherein the thickening dispersant (D) includes a polyalkylene oxide having a phenyl group in the side chain.

[2] The slurry for a positive electrode of a lithium-ion secondary battery according to [1], wherein the polyalkylene oxide having a phenyl group in the side chain is a compound represented by the following formula (1),

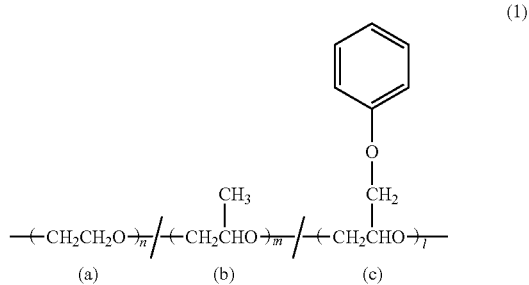

(1)

wherein, n, m and l represent the molar ratios of the monomers, n, m and l represent integers and n+m+l=100, n+m≤98, l≥2.

[3] The slurry for a positive electrode of a lithium-ion secondary battery according to [1] or [2], wherein a content of the resin binder (C) with respect to 100 parts by mass of the positive electrode active material (A) is 0.2 parts by mass or more and 5.0 parts by mass or less.

[4] The slurry for a positive electrode of a lithium-ion secondary battery according to any one of [1] to [3], wherein a content of the thickening dispersant (D) with respect to 100 parts by mass of the positive electrode active material (A) is 0.2 parts by mass or more and 5.0 parts by mass or less.

[5] A positive electrode for a lithium-ion secondary battery which comprises a positive electrode current collector and a positive electrode active material layer formed on the positive electrode current collector, wherein the positive electrode active material layer comprises a positive electrode active material,
wherein the positive electrode active material layer is formed from the slurry for a positive electrode of a lithium-ion secondary battery according to any one of [1] to [4].

[6] A method of producing a positive electrode for a lithium-ion secondary battery, wherein the positive electrode comprises a positive electrode current collector and a positive electrode active material layer formed on the positive electrode current collector, wherein the positive electrode active material layer comprises a positive electrode active material,
wherein the method comprises a step of applying the slurry for a positive electrode of a lithium-ion secondary battery according to any one of [1] to [4] to the positive electrode current collector to form the positive electrode active material layer.

[7] A lithium-ion secondary battery comprising the positive electrode for a lithium-ion secondary battery according to [5].

[8] A method of producing a positive electrode for a lithium-ion secondary battery, including steps of preparing a slurry for a positive electrode of a lithium-ion secondary battery according to any one of [1] to [4];
preparing a positive electrode for a lithium-ion secondary battery by applying the slurry for a positive electrode of a lithium-ion secondary battery on a positive electrode current collector to form a positive electrode active material layer; and
assembling a lithium-ion secondary battery comprising the positive electrode for a lithium-ion secondary battery.

According to the present invention, by using a specific resin binder in combination with a specific thickening dispersant, a lithium-ion secondary battery having high dispersibility of the positive electrode active material and low initial resistance value can be obtained. In addition, a slurry for a positive electrode of a lithium-ion secondary battery, which can be uniformly coated on current collector, can be provided. Further, a positive electrode for a lithium-ion secondary battery obtained using the slurry for a positive electrode of a lithium-ion secondary battery, a production method for the electrode, a lithium-ion secondary battery provided with the positive electrode for a lithium-ion secondary battery, and a production method for the battery can be provided.

DETAILED DESCRIPTION OF THE INVENTION

As embodiments of the present invention, a slurry for a positive electrode of a lithium-ion secondary battery, a positive electrode for a lithium-ion secondary battery obtained using the slurry for a positive electrode of a lithium-ion secondary battery, a production method for the electrode, a lithium-ion secondary battery provided with the positive electrode for a lithium-ion secondary battery, and a production method for the battery will be described.

It is to be noted that the present embodiment will be described in detail in order to clarify the gist of the invention, and the present embodiment does not limit the present invention unless otherwise specified.

[Slurry for Positive Electrode of Lithium-Ion Secondary Battery]

The slurry for positive electrode of the lithium-ion secondary battery of the present invention includes a positive electrode active material (A), a conductive auxiliary agent (B), a resin binder (C), a thickening dispersant (D), and water (E). The resin binder (C) is a copolymer of monomers containing an aromatic vinyl compound and at least one of ethylenically unsaturated carboxylic acid ester and an ethylenically unsaturated carboxylic acid. The thickening dispersant (D) containing polyalkylene oxide having a phenyl group in the side chain.

Hereinafter, a slurry for a positive electrode of a lithium-ion secondary battery may be referred to as a positive electrode slurry.

<Positive Electrode Active Material (A)>

The positive electrode active material (A) is not particularly limited as long as it is a positive electrode active material that can be used for a lithium-ion secondary battery. Examples of the positive electrode active material (A) include a lithium cobalt oxide ($LiCoO_2$); lithium spinel manganese oxide ($LiMn_2O_4$); olivine type lithium iron phosphate ($LiFePO_4$); nickel-containing lithium complex compound such as Ni—Mn—Co type, Ni—Mn—Al type, Ni—Co—Al type or the like; and chalcogen compound such as $LiTiS_2$, $LiMnO_2$, $LiMoO_3$, $LiV_2O_5$ or the like. As the positive electrode active material (A), one type may be used alone, or two or more types may be used in combination.

<Conductive Auxiliary Agent (B)>

The conductive auxiliary agent (B) is not particularly limited as long as it has conductivity, but it is usually preferable to use carbon material. The carbon material is not particularly limited as long as it is conductive carbon material, but graphite, carbon black, carbon fiber, or the like can be used. As the carbon material, one type may be used alone, or two or more types may be used in combination.

As the carbon black, for example, acetylene black, Ketjen black, furnace black, channel black and thermal black can be used. Of these, acetylene black and ketjen black are preferable.

In the positive electrode slurry of the lithium-ion secondary battery of the present invention, a content of the conductive auxiliary agent (B) with respect to 100 parts by mass of the positive electrode active material (A) is preferably 1 to 10 parts by mass, more preferably 2 to 8 parts by mass, and still more preferably 4 to 6 parts by mass.

If the content of the conductive auxiliary agent (B) is within the above range, the lithium-ion secondary battery including the positive electrode for a lithium-ion secondary battery fabricated using the positive electrode slurry of the lithium-ion secondary battery has an desirable capacity balance per volume and desirable durability (cycle characteristics).

<Resin Binder (C)>

The resin binder (C) is a copolymer of monomers containing an aromatic vinyl compound and at least one of ethylenically unsaturated carboxylic acid ester and an ethylenically unsaturated carboxylic acid.

The aromatic vinyl compound, which is a raw material monomer of the copolymer, is a compound having an ethylenic carbon-carbon double bond and an aromatic ring.

Examples of the aromatic vinyl compound include styrene, α-methylstyrene, styrenesulfonic acid and the like. Among them, styrene is preferred.

Examples of the ethylenically unsaturated carboxylic acid ester include alkyl esters of α, β-unsaturated monocarboxylic acid or dicarboxylic acid (acrylic acid, methacrylic acid, crotonic acid, itaconic acid, maleic acid, fumaric acid etc.). The alkyl chain of the ester is preferably a linear, branched or cyclic alkyl chain of 1 to 18 carbon atoms, more preferably a linear, branched or cyclic alkyl chain of 2 to 12 carbon atoms, more preferably a linear, branched or cyclic alkyl chain having 2 to 8 carbon atoms.

As the ethylenically unsaturated carboxylic acid ester, a (meth) acrylic acid ester having a linear, branched or cyclic alkyl chain of 2 to 8 carbon atoms is preferable.

The (meth) acrylic acid means a methacrylic acid or an acrylic acid.

Furthermore, as long as the binding properties between the positive electrode active materials and between the positive electrode active material and the current collector are not impaired, the resin binder (C) may be an copolymer of an aromatic vinyl compound and at least one of the ethylenically unsaturated carboxylic acid ester and the ethylenically unsaturated carboxylic acid, as well as other monomers including a hydroxyalkyl (meth) acrylate, an aminoalkyl (meth) acrylate, vinyl esters such as vinyl acetate and vinyl alkanoate, monoolefins (ethylene, propylene, butylene, isobutylene, etc.), diolefin (allene, methyl allene, butadiene), a carbonyl group-containing ethylenic unsaturated monomer such as diacetone acrylamide, and sulfonic acid group-containing ethylenically unsaturated monomer. One type of these monomers may be used alone, or two or more types thereof may be used in combination.

Among the above-mentioned resin binder (C), from the viewpoint of improving the dispersibility of the positive electrode active material in the positive electrode slurry of the lithium-ion secondary battery, and from the viewpoint of further improving dissolution resistance to an electrolytic solution and oxidation resistance in the positive electrode for the purpose of improving the characteristics of the lithium-ion secondary battery, the resin binder (C) is preferably a styrene-(meth) acrylic acid ester copolymer, a styrene-(meth) acrylic acid copolymer, a styrene-(meth) acrylic acid ester-(meth) acrylic acid copolymer, or a styrene-(meth) acrylate ester-acrylic acid-sodium styrene sulfonate copolymer. Among them, from the viewpoint of reducing the occurrence of aggregates due to industrial production, the styrene-(meth) acrylate ester-acrylic acid-sodium styrene sulfonate copolymer is more preferable With respect to 100 parts by mole of the copolymer constituting units of the copolymer of the monomers containing an aromatic vinyl compound and at least one of ethylenically unsaturated carboxylic acid ester and an ethylenically unsaturated carboxylic acid, a content of the ethylenically unsaturated carboxylic acid ester unit is preferably 25 to 85 parts by mo, more preferably 30 to 80 parts by mol.

When the content of the ethylenically unsaturated carboxylic acid ester unit is within the above range, flexibility and heat resistance of the obtained positive electrode are improved, and the binding properties between the positive electrode active materials and between the positive electrode active material and the current collector are also improved.

A content of the ethylenically unsaturated carboxylic acid with respect to 100 parts by mol of the total constituting units of the copolymer of the monomers including an aromatic vinyl compound and at least one of ethylenically unsaturated carboxylic acid ester and an ethylenically unsaturated carboxylic acid is preferably 1 to 10 parts by mole, more preferably 1 to 5 parts by mole.

When the content of the ethylenically unsaturated carboxylic monomer unit is within the above range, the emulsion polymerization stability or mechanical stability of the copolymer of the aromatic vinyl compound and the ethylenically unsaturated carboxylic acid is maintained, and the positive electrode binding properties between the active materials and between the positive electrode active material and the current collector are improved.

In addition, the resin binder (C), particularly a copolymer of an ethylenically unsaturated carboxylic acid ester or an ethylenically unsaturated carboxylic acid and an aromatic vinyl compound, may contain other monomers which are used as a crosslinking agent, if necessary, and the other monomers may include epoxy group-containing α, β-ethylenically unsaturated compounds such as glycidyl (meth) acrylate; hydrolyzable alkoxysilyl group-containing α, β-ethylenically unsaturated compounds such as vinyl triethoxysilane and γ-methacryloxypropyl trimethoxysilane; polyfunctional vinyl compound such as ethylene glycol di (meth) acrylate, trimethylolpropane tri (meth) acrylate, allyl (meth) acrylate, divinylbenzene, diallyl phthalate. They may crosslink themselves or may be crosslinked in combination with an ethylenically unsaturated compound component having an active hydrogen group. It is also possible to introduce a carbonyl group-containing α, β-ethylenically unsaturated compound or the like into a copolymer, and in combination with a compound having a hydrazide group to be crosslinked. The compound having a hydrazide group may include polyhydrazine compound, particularly, oxalic acid dihydrazide, succinic acid dihydrazide, adipic acid dihydrazide, polyacrylic acid dihydrazide and the like.

As a polymerization method for obtaining the resin binder (C), particularly copolymer of aromatic vinyl compound and one of ethylenically unsaturated carboxylic acid ester and ethylenically unsaturated carboxylic acid, a conventionally known method is used. Among the known methods, it is preferable to use an emulsion polymerization method.

As a surfactant used for emulsion polymerization, usual an anionic surfactant and nonionic surfactant can be used.

Examples of the anionic surfactant include alkylbenzenesulfonic acid salt, alkylsulfuric acid ester salt, polyoxyethylene alkyl ether sulfuric acid ester salt, fatty acid salts and the like.

Examples of the nonionic surfactant include polyoxyethylene alkyl ether, polyoxyethylene alkyl phenyl ether, polyoxyethylene polycyclic phenyl ether, polyoxyalkylene alkyl ether, sorbitan fatty acid ester, polyoxyethylene sulphinate fatty acid ester and the like.

One of these surfactants may be used alone, or two or more thereof may be used in combination.

The amount of the surfactant used in the emulsion polymerization is preferably 0.1 to 3 parts by mass, more preferably 0.1 to 1.0 parts by mass, with respect to 100 parts by mass of the total monomers.

When the amount of the surfactant used falls within the above range, the particle size of the aqueous emulsion obtained becomes the desired particle diameter, stable emulsion polymerization can be carried out, and the decrease in adhesion between the positive electrode active material and the current collector is suppressed.

As a radical polymerization initiator used in the emulsion polymerization, a known and commonly used radical polymerization initiator can be used. Examples thereof include ammonium persulfate, potassium persulfate, hydrogen peroxide, t-butyl hydroperoxide, and the like. If necessary, redox polymerization may be carried out by using these polymerization initiators in combination with a reducing agent such as sodium bisulfite, Rongalite, ascorbic acid or the like.

As an emulsion polymerization method for obtaining the resin binder (C), a polymerization method of charging collectively, or a method of polymerizing while continuously feeding each component, and the like may be used.

Polymerization is usually carried out with stirring within a temperature range of 30 to 90° C. Since the ethylenically unsaturated carboxylic acid used for copolymerization shifts the system to acidic, the pH is adjusted by adding a basic substance during or after the polymerization. As a result, it is possible to improve polymerization stability, mechanical stability and chemical stability during emulsion polymerization. Examples of the basic substance used in this case include ammonia, triethylamine, ethanolanmine, caustic soda, and the like. As the basic substance, one type may be used alone, or two or more types may be used in combination.

In the positive electrode slurry of the lithium-ion secondary battery of the present invention, a content of the resin binder (C) with respect to 100 parts by mass of the positive electrode active material (A) is 0.2 to 5.0 parts by mass, and more preferably 0.2 to 3.0 parts by mass.

When the content of the resin binder (C) is within the above range, the slurry for the positive electrode of the lithium-ion secondary battery with good binding property between the positive electrode active materials and between the positive electrode active material and the current collector, and the positive electrode for the lithium-ion secondary battery can be provided. Further, by using the positive electrode, it is possible to provide a lithium-ion secondary battery having high initial discharge capacity and desirable high temperature charge and discharge cycle characteristics.

<Thickening Dispersant (D)>

The thickening dispersant (D) is used for increasing the binding property between the positive electrode active materials contained in the positive electrode slurry and between the positive electrode active material and the current collector, increasing the dispersibility of the positive electrode active material in the positive electrode slurry, and improving the stability of the slurry for positive electrode.

In the present invention, since the thickening dispersant (D) contains a polyalkylene oxide having a phenyl group in the side chain, the dispersibility of the positive electrode active material in the positive electrode slurry can be further enhanced. In addition, the thickening dispersant (D) may also contain a water-soluble polymer. Examples of the water-soluble polymers capable of increasing the dispersibility of the positive electrode active material in the positive electrode slurry include derivatives of cellulose such as carboxymethyl cellulose (CMC), polyalkylene oxide derivatives, polyvinyl alcohol derivatives, polycarboxylic acid derivatives (including these salts), polycarboxylic acid ester derivatives, polyvinylamide derivatives and copolymers of ethylenically unsaturated carboxylic acid and vinylamide. The thickening dispersant (D) may be a polyalkylene oxide having a phenyl group in the side chain. Also, the thickening dispersant (D) may be a polyalkylene oxide and carboxymethyl cellulose (CMC), having a phenyl group in the side chain.

The polyalkylene oxide having a phenyl group in the side chain is preferably a compound represented by the following formula (1),

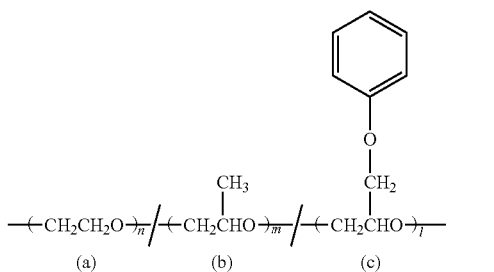

(1)

wherein n, m and l are molar ratios of monomers, n, m and l are integers and n+m+l=100, n+m≤98, l≥1.

As the compound represented by the above formula (1), n=50 to 98, m=1 to 10, and l=1 to 10 are preferable, n=80 to 98, m=1 to 10, l=from 1 to 10 are more preferably.

When the phenyl group abundance ratio is defined as the following formula, it is preferably 1 to 10%.

Phenyl group abundance ratio (%): $1/(n+m+l) \times 100$

In the above formula (1), n, m, and l indicate the molar ratio of the monomers, and do not indicate that n, m, and l of each monomer unit are connected in succession. Also, the formula (1) does not mean block copolymerization.

The molecular weight of the water-soluble polymer used for the thickening dispersant (D) is not particularly limited, but it is preferable to set the molecular weight according to the viscosity of the aqueous solution of the thickening dispersant (D) used at the time of producing the positive electrode slurry. When the compound represented by the above formula (1) is used as the thickening dispersant, the weight average molecular weight (MW) is not particularly limited, but it is preferably 10,000 to 1,000,000, more preferably 20,000 to 500,000.

When the weight average molecular weight of the compound represented by the above formula (1) is within the above range, the dispersibility of the conductive auxiliary agent is excellent and the initial DC resistance is low.

In the present specification, the weight average molecular weight is a value obtained by measuring a sample under the following conditions using gel permeation chromatography (trade name: Shodex (registered trademark) GPC-101, manufactured by Showa Denko KK), and calculating the result by using a pullulan calibration curve.

Analytical column: (1) OHpak SB-803 HQ, (2) OHpak SB-804 HQ, manufactured by Showa Denko KK Reference column: OHpak SB-800RL, manufactured by Showa Denko KK Column temperature: 40° C.
Sample: sample concentration was 0.1% by mass
Flow rate: 1 mL/min
Eluent: 0.1 M aqueous sodium nitrate solution
Detector: RI-71S As the compound represented by the above formula (1), for example, Alcox CP-B (trade name) manufactured by Meisei Chemical Industry Co., Ltd. can be used.

One type of these water-soluble polymers may be used alone, or two or more types thereof may be used in combination. It is also preferable to use a copolymer obtained by copolymerizing monomers of each water-soluble polymer.

From the viewpoint of thickening and dispersion of the positive electrode slurry, a viscosity (mPa·s) of an aqueous solution of 1% the thickening dispersant (D) measured by using a rotary viscometer (trade name: TVB-25L, manufactured by Toki Sangyo Co., Ltd.) at 23° C. in at 60 revolutions per minute is preferably 1 mPa·s to 10,000 mPa·s, and more preferably 10 mPa·s to 2,000 mPa·s. By using a thickening dispersant having a viscosity within the above range, the viscosity of the aqueous solution of the thickening dispersant (D) is kept at a desired viscosity. Therefore, the dispersibility of the positive electrode active material (A), the conductive auxiliary agent (B), the resin the binder (C) and the thickening dispersant (D); and the binding properties between the positive electrode active materials and between the positive electrode active material and the current collector are improved. As a result, the coating properties of the slurry on the current collector is excellent.

In the positive electrode slurry of the lithium-ion secondary battery of the present invention, the content of the thickening dispersant (D) with respect to 100 parts by mass of the positive electrode active material (A) is 0.2 to 5.0 parts by mass, and more preferably 0.2 to 3.0 parts by mass.

When the content of the thickening dispersant (D) is within the above range, the dispersibility of the positive electrode active material is further enhanced, so that the positive electrode active material is uniformly dispersed, and a viscosity of the positive electrode slurry, which is suitable for coating the current collector, is obtained.

In addition, when the thickening dispersant (D) further contains a water-soluble polymer (for example, CMC) in order to sufficiently exert the effect of the present invention, in the slurry for positive electrode of the lithium-ion secondary battery of the present invention, the content of the polyalkylene oxide having a phenyl group in the side chain (for example, the compound of the general formula (1)) is 5 parts by mass or more, more preferably 10 parts by mass or more, and still more preferably 30 parts by mass or more, with respect to 100 parts by mass of the thickening dispersant (D).

<Water (E)>

In the positive electrode slurry of the lithium-ion secondary battery of the present invention, as water which is used as a dispersion medium, water (ion exchanged water) treated with an ion exchange resin and water treated by a reverse osmosis membrane water purification system (super-pure water) and the like are preferable.

In the positive electrode slurry of the lithium-ion secondary battery of the present invention, the content of water (E) with respect to 100 parts by mass of the positive electrode active material (A) is preferably 20 to 100 parts by mass, more preferably 30 parts by mass part or more, more preferably 90 parts by mass or less, and still more preferably 40 to 80 parts by mass.

When the water content is 20 parts by mass or more, a high-concentration slurry can be produced, and the drying step at the time of preparing the electrode is facilitated.

Since the resin binder (C) and the thickening dispersant (D) are used in combination for the positive electrode slurry of the lithium-ion secondary battery of the present invention, the lithium secondary having a high dispersibility of the positive electrode active material and a battery having a low initial resistance value is obtained. And it is possible that the slurry is uniformly coated on the current collector.

[Method for Producing Slurry for Positive Electrode of Lithium-Ion Secondary Battery]

The positive electrode slurry of the lithium-ion secondary battery of the present invention is obtained by dispersing or dissolving a mixture containing a positive electrode active material (A), a conductive auxiliary agent (B), a resin binder (C), and a thickening dispersant (D) in water (E).

The positive electrode slurry is preferably an aqueous dispersion. However, the positive electrode slurry may contain water and a highly hydrophilic solvent within a range that does not affect the environmental burden.

As a method of dispersing or dissolving the positive electrode active material (A), the conductive auxiliary agent (B), the resin binder (C), and the thickening dispersant (D) in water (E), there is no particular limitation as long as it is a method capable of uniformly dispersing or dissolving these components. And examples thereof include a method using a planetary mixer, a Disper, and a ball mill.

As a preparation method of the positive electrode slurry, for example, the following method can be used. The resin binder (C) and the thickening dispersant (D) are dispersed or dissolved in water (E) (or a solvent having high affinity for water). Thereafter, the positive electrode active material (A) and the conductive auxiliary agent (B) are added to the dispersion or solution, and additives such as a pH adjusting agent, a wetting agent and a defoaming agent are added as necessary. Then, the mixture is further dispersed, dissolved or kneaded.

[Positive Electrode for Lithium-Ion Secondary Battery]

The positive electrode for a lithium-ion secondary battery of the present invention includes a positive electrode current collector and a positive electrode active material layer, which includes a positive electrode active material, formed on the positive electrode current collector. The positive electrode active material layer is formed from the positive electrode slurry of the lithium-ion secondary battery of the present invention.

The positive electrode current collector is not particularly limited as long as it is made of a metal, one example being a current collector made of aluminum.

Although the shape of the positive electrode current collector is not particularly limited, it is usually preferable to use a sheet-like positive electrode current collector having a thickness of 0.001 mm or more and 0.5 mm or less.

Since the positive electrode for a lithium-ion secondary battery of the present invention is provided with the positive electrode active material layer formed from the positive electrode slurry of the lithium-ion secondary battery of the present invention, the positive electrode active material layer and the current collector have good binding properties. Therefore, the lithium-ion secondary battery including the positive electrode for a lithium-ion secondary battery of the present invention has a low possibility of causing a decrease in capacity.

[Production Method of Positive Electrode for Lithium-Ion Secondary Battery]

The method for producing a positive electrode for a lithium-ion secondary battery of the present invention includes steps of applying the positive electrode slurry of the lithium-ion secondary battery of the present invention on the positive electrode current collector and drying it to form the positive electrode active material layer.

As a method of applying the positive electrode slurry to the positive electrode current collector, a general method is used. Examples of the method include a reverse roll method, a direct roll method, a doctor blade method, a knife method, an extrusion method, a curtain method, a gravure method, a bar method, a dipping method, and a squeeze method.

Application of the positive electrode slurry to the positive electrode current collector can be performed on one side or both sides of the positive electrode current collector. In the case of coating on both sides of the positive electrode current collector, the slurry may be sequentially coated on one side by one side, or may be coated on both sides at the same time.

Further, it may be applied continuously or intermittently to the surface of the positive electrode current collector. The thickness, length and width of the coating layer of the positive electrode slurry are appropriately set according to the size of the lithium-ion secondary battery.

As a drying method of the positive electrode slurry, a general method can be used. For example, a drying method using hot air, vacuum, infrared, far infrared, electron beam, or low temperature wind can be provided. One of these drying methods may be used alone, or two or more thereof may be used in combination.

The drying temperature is preferably 50 to 350° C., and more preferably 50° C. to 200° C.

The positive electrode for a lithium-ion secondary battery can be formed by pressing as necessary. As a method of pressing, a general method can be used, but a die pressing method and a calendar pressing method are preferable. Although the pressing pressure is not particularly limited, it is preferably 0.1 to 10 t/cm$^2$, more preferably 0.5 to 5.0 t/cm$^2$.

[Lithium-Ion Secondary Battery]

The lithium-ion secondary battery of the present invention includes the positive electrode for a lithium-ion secondary battery of the present invention.

Examples of the lithium-ion secondary battery include the following two nonaqueous secondary batteries.

A nonaqueous secondary battery is obtained by providing the negative electrode and the positive electrode for a lithium-ion secondary battery of the present invention via a lithium-ion permeable separator (for example, a porous film made of polyethylene or polypropylene) and impregnating them in a nonaqueous electrolytic solution.

A cylindrical nonaqueous secondary battery is obtained by forming a laminate including "the positive electrode for a lithium-ion secondary battery of the present invention/a separator/a negative electrode/a separator", and forming a wound body by winding the laminate in a roll form (spirally), and accommodating it in a bottomed metal casing together with an electrolytic solution. The positive electrode for a lithium-ion secondary battery of the present invention has positive electrode active material layers formed on both sides of a positive electrode positive electrode current collector, and the negative electrode has negative electrode active material layers formed on both sides of a negative electrode current collector.

As the negative electrode used in the lithium-ion secondary battery of the present invention, for example, a known negative electrode in which a negative electrode active material layer containing a negative electrode active material or a binder is formed on a negative electrode current collector can be used.

As the negative electrode active material, a negative electrode active material containing an element capable of occluding and releasing lithium-ions, a known negative electrode active material such as a carbon material, or the like can be used.

An element capable of occluding and releasing lithium-ions includes an element that can be alloyed with lithium. For example, silicon, germanium, tin, lead, aluminum, indium and zinc can be used. By using an active material containing such the element as a negative electrode active material, it is possible to increase the capacity of the lithium-ion secondary battery.

Specific examples of the negative electrode active material containing an element capable of occluding and releasing lithium-ions include a metal compound, a metal oxide, a lithium metal compound, a lithium metal oxide (including a lithium-transition metal composite oxide), and the like.

Examples of the negative electrode active material in the form of a metal compound include LiAl, $Li_4Si$, $Li_{4.4}Pb$, $Li_{4.4}Sn$, and the like.

Examples of the negative electrode active material in the form of a metal oxide include SnO, $SnO_2$, GeO, $GeO_2$, $In_2O$, $In_2O_3$, PbO, $PbO_2$, $Pb_2O_3$, $Pb_3O_4$, SiO, ZnO and the like.

Examples of the carbon material include carbon materials such as graphite, amorphous carbon, carbon fiber, coke, activated carbon, carbon nanotube, carbon nanofiber, and fullerene.

One type of these negative electrode active materials may be used alone, or two or more types may be used in combination.

The binder used for the negative electrode is not particularly limited, but a known binder resin for a negative electrode can be used.

The material of the negative electrode current collector is not particularly limited as long as it has conductivity, for example, a metal can be used. As the metal, a metal which is difficult to form an alloy with lithium is preferable, and specific examples thereof include copper, nickel, iron, titanium, vanadium, chromium, manganese, and alloys thereof.

Examples of a shape of the negative electrode current collector include a thin film shape, a net shape, and a fibrous shape. Among them, a thin film is preferable.

A thickness of the negative electrode current collector is preferably 5 to 30 μm, and more preferably 8 to 25 μm.

As an electrolytic solution, for example, in the case of a lithium-ion secondary battery, a solution in which a lithium salt as an electrolyte is dissolved in a nonaqueous organic solvent at a concentration of about 1 mol/L can be used.

Examples of the lithium salts include $LiClO_4$, $LiBF_4$, LiI, $LiPF_6$, $LiCF_3SO_3$, $LiCF_3CO_2$, $LiAsF_6$, $LiSbF_6$, $LiAlCl_4$, LiCl, LiBr, $LiB(C_2H_5)_4$, $LiCH_3SO_3$, $LiC_4F_9SO_3$, $Li(CF_3SO_2)_2N$, $Li[(CO_2)_2]_2B$ and the like.

Examples of the nonaqueous organic solvent include carbonates such as propylene carbonate, ethylene carbonate, butylene carbonate, dimethyl carbonate, diethyl carbonate, and methylethyl carbonate; lactones such as γ-butyrolactone and the like; ethers such as trimethoxymethane, 1,2-dimethoxyethane, diethyl ether, 2-ethoxyethane, tetrahydrofuran, 2-methyltetrahydrofuran and the like; sulfoxides such as dimethylsulfoxide and the like; oxolanes such as 1,3-dioxolane and 4-methyl-1,3-dioxolane; nitrogen-containing compounds such as acetonitrile, nitromethane and NMP; esters such as methyl formate, methyl acetate, butyl acetate, methyl propionate, ethyl propionate, and triester; glymes such as diglyme, triglyme, tetraglyme and the like; ketones such as acetone, diethyl ketone, methyl ethyl ketone, methyl isobutyl ketone and the like; sulfones such as sulfolane: oxazolidinones such as 3-methyl-2-oxazolidinone; sultones such as 1,3-propane sultone, 4-butane sultone and naphtha-sultone and the like. One of these nonaqueous organic solvents may be used alone, or two or more thereof may be used in combination.

Since the lithium-ion secondary battery of the present invention includes the positive electrode for a lithium-ion secondary battery of the present invention, the capacity maintenance ratio is high.

[Method for Producing Lithium-Ion Secondary Battery]

The method for producing a lithium-ion secondary battery of the present invention includes steps of preparing the positive electrode slurry of the lithium-ion secondary battery of the present invention, preparing a positive electrode for a lithium-ion secondary battery by applying a positive electrode slurry of the lithium-ion secondary battery on a positive electrode current collector to form a positive electrode active material layer, and assembling a lithium-ion secondary battery including the positive electrode for a lithium-ion secondary battery.

The step of assembling the lithium-ion secondary battery is not particularly limited as long as the positive electrode for a lithium-ion secondary battery of the present invention is used as a positive electrode.

In the step of assembling the lithium-ion secondary battery, for example, the positive electrode and the negative electrode are arranged via a permeable separator, and impregnated with a nonaqueous electrolytic solution. Next, the negative electrode is connected to the negative electrode terminal, and the positive electrode is connected to the positive electrode terminal to obtain a lithium-ion secondary battery.

Further, when the lithium-ion secondary battery is cylindrical type, it is obtained as follows. First, a laminate including "a negative electrode/a separator/the positive electrode for a lithium-ion secondary battery according to the present invention/a separator" is wound into a roll (spiral) to form a wound body, wherein in the negative electrode, negative electrode active material layers are formed on both sides of a negative electrode current collector; and in the positive electrode for a lithium-ion secondary battery according to the present invention positive electrode active material layers are formed on both sides of a positive electrode current collector. The obtained wound body is housed in a metal casing (battery can). The negative electrode is connected to the negative electrode terminal, and the positive electrode is connected to the positive electrode terminal. Subsequently, the metal casing is impregnated with an electrolytic solution, and then the metal casing is sealed to obtain a cylindrical lithium-ion secondary battery.

According to the method for producing a lithium-ion secondary battery of the present invention, the lithium-ion secondary battery of the present invention can be obtained by a simple process.

EXAMPLE

Hereinafter, the present invention will be described more specifically with reference to Examples and Comparative Examples, but the present invention is not limited to the following Examples.

In the examples and comparative examples, "parts" means parts by mass unless otherwise specified. In addition, "%" in the examples and comparative examples represents mass % unless otherwise noted, except for that "%" is the phenyl group abundance ratio. The positive electrode slurry of the lithium-ion secondary battery is obtained in the examples, the positive electrode for the lithium-ion secondary battery is obtained by using the slurry, and the secondary lithium-ion secondary battery is obtained by using the positive electrode for the lithium-ion secondary battery. The performance evaluation test of the battery was carried out by the following method.

[Production of Resin Binder (C)]

100 parts by mass of ion exchanged water and 0.9 parts by mass of a reactive anionic emulsifier (trade name: Eleminol JS-20, active ingredient 40%, manufactured by Sanyo Chemical Industries, Ltd.) were placed in a separable flask having a cooling tube, a thermometer, a stirrer and a dropping funnel, and the temperature was raised to 75° C.

Subsequently, a emulsion of monomers was added dropwise at 80° C. for 4 hours, wherein the emulsion of monomers was obtained in advance by mixing 6.5 parts by mass of the reactive anionic emulsifying agent, 1.2 parts by mass of a nonreactive anionic emulsifying agent (trade name: HITENOL 08E, polyoxyethylene alkyl ether sulfuric acid ester salt, manufactured by Dai-ichi Kogyo Seiyaku Co., Ltd.), 149 parts by mass of styrene, 131 parts by mass of 2-ethylhexyl acrylate, 5.8 parts by mass of 2-hydroxyethyl methacrylate, 5.8 parts by mass of itaconic acid, 1.2 parts by mass of para styrenesulfonic acid, 0.1 part by mass of divinylbenzene, and 271 parts by mass of ion exchanged water.

Simultaneously, a polymerization initiator solution was added dropwise at 80° C. for 4 hours for polymerization, wherein the polymerization initiator solution was obtained by dissolving 1.3 parts by mass of potassium persulfate as a polymerization initiator in 29 parts by mass of ion exchanged water.

After completion of the dropwise addition of the monomer emulsion and the polymerization initiator, aging was carried out at 80° C. for 2 hours, and then the reaction solution was cooled to room temperature. Thereafter, 6.0 parts by mass of 25% ammonia water and 36 parts by mass of ion exchanged water were added to the reaction solution. An emulsion of resin (i) (solid content 40.0%) was obtained. The emulsion of the resin (i) had a viscosity of 500 mPa·s and a pH of 7.0 at 10 rpm using a rotary viscometer (trade name: TVB-25L, manufactured by Toki Sangyo Co., Ltd.) at 23° C.

[Preparation of Slurry for Positive Electrode of Lithium-Ion Secondary Battery]

At the contents described in the following examples and comparative examples, a positive electrode active material, a carbon black as a conductive auxiliary agent, a resin binder and a thickening dispersant were mixed and water as a dispersing medium was added to the mixture as needed And the mixture was kneaded to prepare a positive electrode slurry of a lithium-ion secondary battery.

[Production of Positive Electrode]

The positive electrode slurry of a lithium-ion secondary battery was applied to an aluminum foil having a thickness of 20 μm as a current collector so as to have a thickness of 90 μm after roll pressing and dried at 50° C. for 5 minutes on a hot plate, and then dried at 110° C. for 5 minutes to obtain a positive electrode.

[Evaluation of Dispersibility of Conductive Auxiliary Agent]

The surface of the obtained positive electrode was observed with a scanning electron microscope (manufactured by JEOL Ltd.), and the dispersibility of carbon black as a conductive auxiliary agent was visually evaluated.

When the conductive auxiliary agent is present all over the surface of the positive electrode, it is classified as "uniform", and when an aggregation and a non-localized portion of the conductive auxiliary agent existed, it was classified as "slightly non-uniform" or "non-uniform", depending on its degree.

[Preparation of Negative Electrode Slurry]

With respect to 100 parts by mass of artificial graphite as an negative active material (trade name: SCMG (registered trademark)—BR, manufactured by Showa Denko KK), 2 parts by mass of carbon black (acetylene black) as a conductive auxiliary agent, 4 parts by mass of the emulsion polymer containing a styrene-acrylate copolymer (Trade name: Polyzol (registered trademark) LB-200, solid content 40%, viscosity 2000 mPa·s, pH 7.0, manufactured by Showa Denko KK) as a binder, 50 parts by mass of an aqueous CMC solution (CMC concentration: 2 mass %) obtained by dissolving carboxymethyl cellulose (hereinafter referred to as "CMC") (viscosity at 23° C. of 1% by mass of CMC aqueous solution: 1100 mPa·s) in water as a thickening dispersant, were mixed. Further, 5 parts by mass of water was added to the mixture, and the mixture was kneaded to prepare a negative electrode slurry.

[Production of Negative Electrode]

The negative electrode slurry was applied to a copper foil having a thickness of 10 μm as a current collector so as to have a thickness of 60 μm after roll pressing and dried at 50° C. for 5 minutes on a hot plate and then dried at 110° C. for 5 minutes. Thereafter, using a mold press machine, pressing was performed at a press pressure of 2.5 t/cm², and a current collection tab was attached to obtain a negative electrode.

[Preparation of Electrolytic Solution]

$LiPF_6$ was dissolved at a concentration of 1.0 mol/L in a solvent in which ethylene carbonate and diethyl carbonate were mixed at a volume ratio of 2:3 to prepare an electrolytic solution.

[Production of Lithium-Ion Secondary Battery]

The positive electrode and the negative electrode prepared as described above were opposed to each other with a separator made of polyethylene sandwiched therebetween and housed in a container of aluminum laminate. Thereafter, in the glow box under an argon atmosphere, the above electrolytic solution was dropped into a container containing the positive electrode and the negative electrode, and the laminate container was thermocompression bonded while depressurizing to prepare a lithium-ion secondary battery. The theoretical capacity of this battery was designed to be 16.5 mAh.

[Evaluation of Battery Performance: Initial DC Resistance]

The lithium-ion secondary battery was evaluated using a charge/discharge test apparatus manufactured by Nittetsu Elelex Co., Ltd.

First, after subjecting the lithium-ion secondary battery to aging treatment, CC-CV (constant current-constant voltage) charge and CC discharge were carried out at two cycles. The average capacity of the two CC discharges was determined as the initial capacity of the lithium-ion secondary battery. After measuring the initial capacity, a capacity corresponding to 60% of the initial capacity was charged at 0.2C under a 25° C., then CC discharge was performed for 1 minute at 0.2C. and the discharge current and voltage after 1 second were measured. The same CC discharge was also carried out at 0.5C, 1.0C and 2.0C, the discharge current and voltage after 1 second each were measured, each measured value was plotted, the slope of the approximate straight line was defined as the initial DC resistance. The above-mentioned CC-CV charge means the battery was charged with 1C (current fully charged and discharged in 1 hour) until it reached the upper limit voltage, then charged with a constant voltage (4.2 V) until the CV time (1.5 hours) elapsed. The upper limit voltage was 4.2 V, when $LiCo_{1/3}Ni_{1/3}Mn_{1/3}O_2$ (NMC), $LiCo_{1.5/10}Ni_{7/10}Mn_{1.5/10}O_2$ (Hi-Ni NMC) and $LiCoO_2$ (LCO) were used as positive electrode active materials; and the upper limit voltage was 3.65 V when $LiFePO_4$ (LFP) was used. The above-mentioned CC discharge means that the battery was discharged at 0.2C until the voltage reached lower limit voltage. The lower limit voltage was 2.0 V when LFP was used as the positive electrode active material, and the lower limit voltage was 2.75 V when the others were used.

Example 1

In preparation of a positive electrode slurry, 1.25 g (resin binder (C): 0.5 g (2.5 parts by mass)) of the above-synthesized resin (i) emulsion (solid content 40.0%) as a resin binder (C); 3 g (Thickening dispersant (D): 0.3 g (1.5 parts by mass)) of Ph-PEO aqueous solution (Ph-PEO concentration: 10 mass %, manufactured by Meisci Chemical Industry Co., Ltd. in the following formula (1): n+m+l=100, n+m=98, l=2, weight average molecular weight 80,000) obtained by dissolving the compound represented by the following formula (1) (hereinafter also referred to as "Ph-PEO") in water as a thickening dispersant (D); 8 g of water (water (E): 40 parts by mass) as a solvent were added and the mixture were kneaded using a planetary mixer (trade name: Hivis Mix 2P-03, manufactured by Primix Corporation). To the kneaded product, 20 g of NMC (a positive electrode active material (A): 100 parts by mass) as a positive electrode active material and 1 g (a conduction auxiliary agent (B): 5 parts by mass) of carbon black (acetylene black) as a conductive auxiliary agent were added. And it was kneaded using a planetary mixer (trade name: Hivis Mix 2P-03, manufactured by Primix Corporation) to prepare a positive electrode slurry.

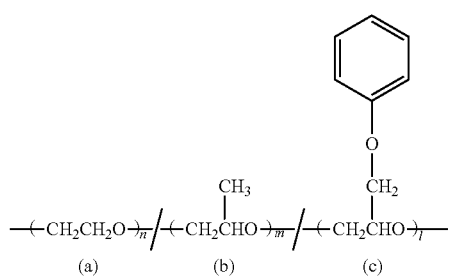

(1)

Example 2

A positive electrode slurry of Example 2 was prepared in the same manner as in Example 1 except that the weight average molecular weight of Ph-PEO was 200,000 in preparing the positive electrode slurry.

Example 3

A positive electrode slurry of Example 3 was prepared in the same manner as in Example 1 except that regarding composition of Ph-PEO, n+m+l=100, n+m=95, and l=5 in preparation of the positive electrode slurry.

Example 4

In the preparation of the positive electrode slurry, 1.25 g of the emulsion (solid content 40.0%) of the resin (i) synthesized as the resin binder (C); 2 g of Ph-PEO aqueous solution (Ph+PEO concentration: 10% by mass; n+m+l=100, n+m=98, l=2, in the above formula (1); weight average molecular weight: 80,000) in which Ph-PEO was dissolved in water as a thickening dispersant; 2 g of CMC aqueous solution (CMC concentration: 5 mass %) in which CMC (trade name: CMC Daicel 1350, manufactured by Daicel) was dissolved in water (the mass ratio of the thickening dispersant was adjusted so that Ph-PEO/CMC=2/1); 7 g of water as a solvent; were added. The mixture was kneaded using a planetary mixer (trade name: Hivis Mix 2P-03 type, manufactured by Primix Corporation). After kneading, 20 g of NMC and 1 g of carbon black (acetylene black) as a conductive auxiliary agent were added to the kneaded product, and it was further kneaded using a planetary mixer (trade name: Hivis Mix 2P-03, manufactured by Primix Corporation) to prepare a positive electrode slurry of Example 4.

Example 5

In the preparation of the positive electrode slurry, 1.25 g of the emulsion (solid content 40.0%) of the resin (i) synthesized as the resin binder (C); 1 g of Ph-PEO aqueous solution (Ph-PEO concentration: 10 mass %, n+m+l=100, n+m=98, l=2 in the above formula (1), weight average molecular weight 80,000); 4 g of an aqueous CMC solution (CMC concentration: 5% by mass) in which CMC (trade name: CMC Daicel 1350, manufactured by Daicel) was dissolved in water (the mass ratio of the thickening dispersant is adjusted to be Ph-PEO/CMC=1/2); 6 g of water as a solvent; were added. The mixture was kneaded using a planetary mixer (trade name: Hivis Mix 2P-03 type, manufactured by Primix Corporation). Thereafter, 20 g of NMC, 1 g of carbon black (acetylene black) as a conductive auxiliary agent were added and it was further kneaded using a planetary mixer (trade name: Hivis Mix 2P-03, manufactured by Primix Corporation) to prepare a positive electrode slurry of Example 5.

Example 6

A positive electrode slurry of Example 6 was prepared in the same manner as in Example 1 except that the positive electrode active material was changed to Hi-Ni NMC in preparation of the positive electrode slurry.

Example 7

A positive electrode slurry of Example 7 was prepared in the same manner as in Example 1 except that in the preparation of the positive electrode slurry, the positive electrode active material was changed to LCO.

Example 8

A positive electrode slurry of Example 8 was prepared in the same manner as in Example 1 except that in the preparation of the positive electrode slurry, the positive electrode active material was changed to LFP.

Comparative Example 1

A positive electrode slurry was prepared in the same manner as in Example 1 except that polyethylene oxide (L8 (manufactured by Meisei Chemical Industry Co., Ltd.), a skeleton having no side chain in the above formula (1), hereinafter referred to as "PEO", weight average molecular weight 80,000) was used as a thickening dispersant, to prepare a positive electrode slurry of Comparative Example 1.

Comparative Example 2

A positive electrode slurry was prepared in the same manner as in Example I except that PEO (R-400 (manufactured by Meiei Chemical Industry Co., Ltd., weight average molecular weight 200,000)) was used as the thickening dispersant, to prepare a slurry for a positive electrode of Comparative Example 2.

Comparative Example 3

A positive electrode slurry was prepared in the same manner as in Example 4 except that PEO (L8 (manufactured by Meisei Chemical Industry Co., Ltd., weight average molecular weight: 80,000)) was used as the thickening dispersant, to prepare a slurry for a positive electrode of Comparative Example 3.

Comparative Example 4

A positive electrode slurry was prepared in the same manner as in Example 5 except that PEO (L8 (manufactured by Meisei Chemical Industry Co., Ltd., weight average molecular weight: 80,000)) was used as the thickening dispersant in the preparation of the positive electrode slurry, to prepare a slurry for a positive electrode of Comparative Example 4.

Comparative Example 5

A positive electrode slurry was prepared in the same manner as in Example 6 except that PEO (L8 (manufactured by Meisei Chemical Industry Co., Ltd., weight average molecular weight: 80,000)) was used as the thickening dispersant, to prepare a slurry for a positive electrode of Comparative Example 5.

Comparative Example 6

A positive electrode slurry was prepared in the same manner as in Example 7 except that PEO (L8 (manufactured by Meisei Chemical Industry Co., Ltd., weight average molecular weight: 80.000)) was used as a thickening dispersant, to prepare a slurry for a positive electrode of Comparative Example 6.

Comparative Example 7

A positive electrode slurry was prepared in the same manner as in Example 8 except that PEO (L8 (manufactured by Meisei Chemical Industry Co., Ltd., weight average molecular weight: 80,000)) was used as the thickening dispersant, to prepare a slurry for a positive electrode of Comparative Example 7.

Comparative Example 8

In the preparation of the positive electrode slurry, 1.25 g of the emulsion (solid content 40.0%) of the resin (i) synthesized as the resin binder (C); 6 g of a CMC aqueous solution (CMC concentration: 5 mass %) prepared by dissolving CMC (trade name: CMC Daicel 1350, manufactured by Daicel Chemical Industries, Ltd.) in water as a thickening dispersant; 5 g of water as a solvent; were added. After kneading using a planetary mixer (trade name: Hivis Mix 2P-03 type, manufactured by Primix Corporation), 20 g of NMC and 1 g of carbon black (acetylene black) as a conductive auxiliary agent were added to the kneaded product. The obtained mixture was further kneaded using a planetary mixer (trade name: Hivis Mix 2P-03, manufactured by Primix Corporation) to prepare a slurry for a positive electrode of Comparative Example 8.

With respect to Examples 1 to 8 and Comparative Examples 1 to 8, dispersibility of the conductive auxiliary agent in the positive electrode and the battery performance were evaluated. The results are shown in Table 1.

Abbreviations in Table 1 are as follows.

NMC: $LiCo_{1/3}Ni_{1/3}Mn_{1/3}O_2$

Hi-Ni NMC: $LiCo_{1.5/10}Ni_{7/10}Mn_{1.5/10}O_2$

LCO: $LiCoO_2$

LFP: $LiFePO_4$

CMC: Carboxymethyl cellulose

Ph-PEO: Polyethylene oxide containing a phenyl group in the side chain (the above formula (1))

PEO: Polyethylene oxide (a)/(b): Mass composition ratio of the thickening dispersant (a) and the thickening dispersant (b)

TABLE 1

| | Thickening Dispersant (a) | Phenyl group abundance ratio (%) | Thickening Dispersant (a) Mw | Thickening Dispersant (b) | Composition ratio of (a) and (b) [(a)/(b)] | Positive electrode active material | Conductive auxiliary agent dispersibility | Initial DC resistance [Q] |
|---|---|---|---|---|---|---|---|---|
| Example 1 | Ph-PEO | 2 | 80,000 | — | — | NMC | Uniform | 2.5 |
| Example 2 | Ph-PEO | 2 | 200,000 | — | — | NMC | Uniform | 2.3 |
| Example 3 | Ph-PEO | 5 | 80,000 | — | — | NMC | Uniform | 2.2 |
| Example 4 | Ph-PEO | 2 | 80,000 | CMC | 2/1 | NMC | Uniform | 2.6 |
| Example 5 | Ph-PEO | 2 | 80,000 | CMC | 1/2 | NMC | Uniform | 2.5 |
| Example 6 | Ph-PEO | 2 | 80,000 | — | — | Hi-Ni NMC | Uniform | 2.7 |
| Example 7 | Ph-PEO | 2 | 80,000 | — | — | LCO | Uniform | 2.6 |
| Example 8 | Ph-PEO | 2 | 80,000 | — | — | LFP | Uniform | 2.7 |
| Comparative Example 1 | PEO | — | 80,000 | — | — | NMC | Unevenness | 5.5 |
| Comparative Example 2 | PEO | — | 200,000 | — | — | NMC | Unevenness | 5.5 |
| Comparative Example 3 | PEO | — | 80,000 | CMC | 2/1 | NMC | Unevenness | 5 |
| Comparative Example 4 | PEO | — | 80,000 | CMC | 1/2 | NMC | Slightly uneven | 4.9 |
| Comparative Example 5 | PEO | — | 80,000 | — | — | Hi-Ni NMC | Unevenness | 6.2 |
| Comparative Example 6 | PEO | — | 80,000 | — | — | LCO | Unevenness | 5.8 |
| Comparative Example 7 | PEO | — | 80,000 | — | — | LFP | Unevenness | 6 |
| Comparative Example 8 | — | — | — | CMC | — | NMC | Slightly uneven | 5.1 |

From the results shown in Table 1, when comparing Example 1 and Comparative Example 1, by using Ph-PEO as the thickening dispersant, the dispersibility of the conductive auxiliary agent improved and the initial direct current resistance of the battery decreased.

In addition, when comparing Example 2 with Comparative Example 2, it was confirmed that even when Ph-PEO having a high molecular weight was used as the thickening dispersant, the dispersibility of the conductive auxiliary agent was improved and the initial direct current resistance of the battery was reduced.

In addition, when comparing Examples 4 and 5 with Comparative Examples 3 and 4, even when Ph-PEO and CMC were used in combination as a thickening dispersant, the dispersibility of the conductive auxiliary agent was improved, it was confirmed that the direct current resistance was reduced.

From Comparative Example 8, in order to improve the dispersibility of the conductive auxiliary agent and to reduce the initial DC resistance of the battery, it is effective to use Ph-PEO as a thickening dispersant. That is, it was confirmed that it is effective to use a compound having a phenyl group.

In addition, when comparing Examples 6 to 8 with Comparative Examples 5 to 7, by using Ph-PEO as the thickening dispersant, it was confirmed that the dispersibility of the conductive auxiliary agent improved, and the initial direct current resistance of the battery was reduced, irrespective of types of the positive electrode active material.

INDUSTRIAL APPLICABILITY

The present invention relates to a slurry for a positive electrode of a lithium-ion secondary battery capable of reducing an initial direct current resistance of a battery, a positive electrode for a lithium-ion secondary battery obtained by using the slurry for a positive electrode of a lithium-ion secondary battery, a lithium-ion secondary battery including the positive electrode for a lithium-ion secondary battery, and a method for producing the same.

The invention claimed is:

1. A slurry for a positive electrode of a lithium-ion secondary battery, comprising a positive electrode active material (A), a conductive auxiliary agent (B), a resin binder (C), a thickening dispersant (D), and water (E),
    wherein the resin binder (C) is a copolymer of monomers which comprise
    an aromatic vinyl compound and
    at least one of an ethylenically unsaturated carboxylic acid ester and an ethylenically unsaturated carboxylic acid,
    wherein the thickening dispersant (D) comprises a polyalkylene oxide having a phenyl group in the side chain, and
    the polyalkylene oxide having a phenyl group in the side chain is a compound represented by the following formula (1),

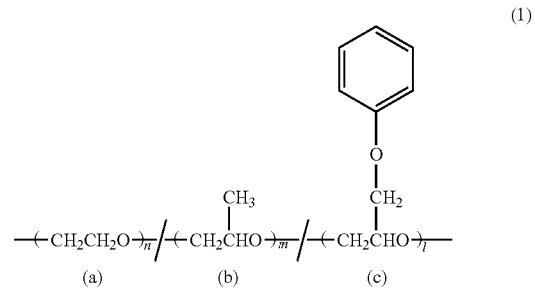

wherein, n, m and l represent molar ratios of monomers, n, m and l represent integers and n+m+l=100, n+m≤98, l≥2.

2. The slurry for a positive electrode of a lithium-ion secondary battery according to claim 1, wherein a content of the resin binder (C) with respect to 100 parts by mass of the positive electrode active material (A) is 0.2 parts by mass or more and 5.0 parts by mass or less.

3. The slurry for a positive electrode of a lithium-ion secondary battery according to claim 1,
    wherein a content of the thickening dispersant (D) with respect to 100 parts by mass of the positive electrode active material (A) is 0.2 to 5.0 parts by mass.

4. A positive electrode for a lithium-ion secondary battery, which comprises a positive electrode current collector and a positive electrode active material layer formed on the positive electrode current collector, wherein the positive electrode active material layer comprises a positive electrode active material,
    wherein the positive electrode active material layer is formed from the slurry for a positive electrode of a lithium-ion secondary battery according to claim 1.

5. A lithium-ion secondary battery comprising the positive electrode for a lithium-ion secondary battery according to claim 4.

6. A method of producing a positive electrode for a lithium-ion secondary battery, wherein the positive electrode comprises a positive electrode current collector and a positive electrode active material layer formed on the positive electrode current collector, wherein the positive electrode active material layer comprises a positive electrode active material,
    wherein the method comprises a step of
    applying the slurry for a positive electrode of a lithium-ion secondary battery according to claim 1 to the positive electrode current collector to form the positive electrode active material layer.

7. A method of producing a positive electrode for a lithium-ion secondary battery, comprising steps of
    preparing a slurry for a positive electrode of a lithium-ion secondary battery according to claim 1;
    preparing a positive electrode for a lithium-ion secondary battery by applying the slurry for a positive electrode of a lithium-ion secondary battery on a positive electrode current collector to form a positive electrode active material layer; and
    assembling a lithium-ion secondary battery comprising the positive electrode for a lithium-ion secondary battery.

* * * * *